Dec. 9, 1941.     A. J. AUMANN     2,265,335
RIP GAUGE LOCK
Filed Dec. 14, 1938
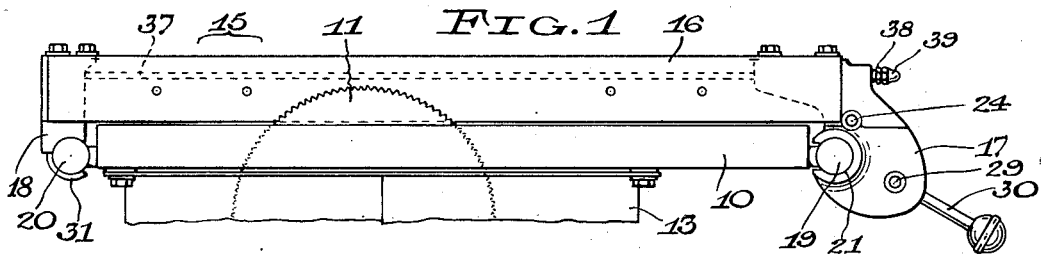
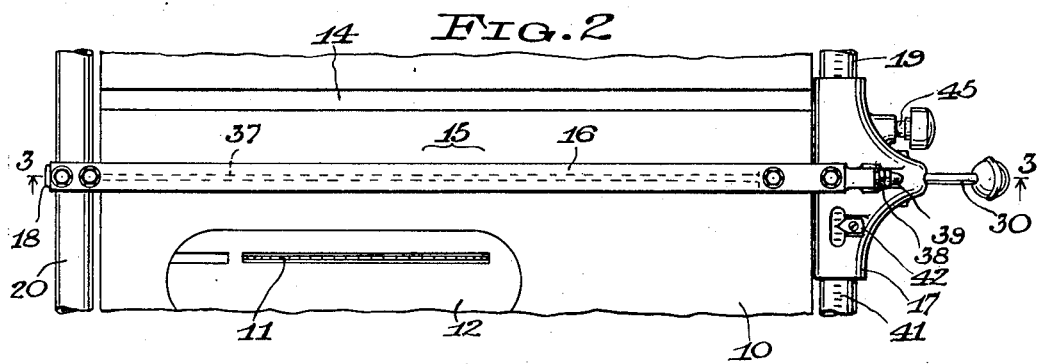
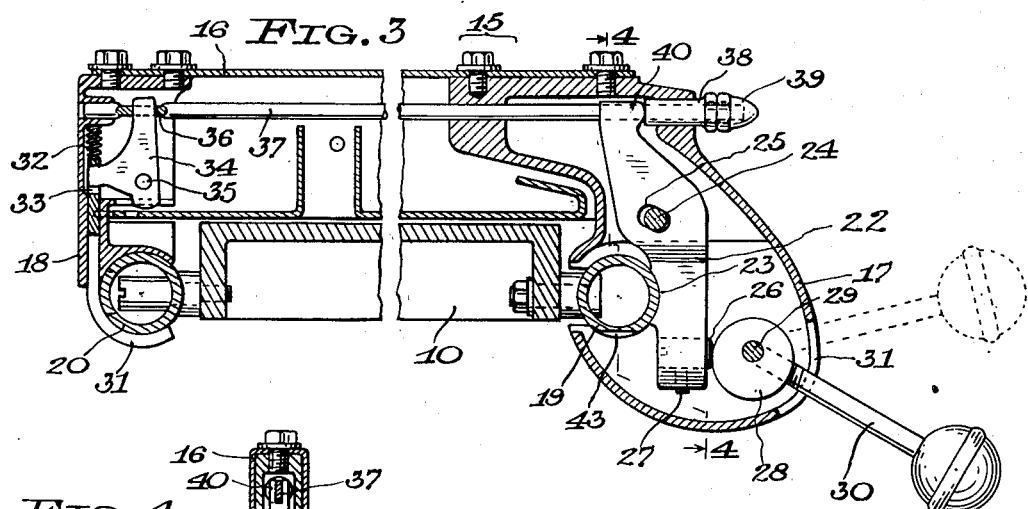
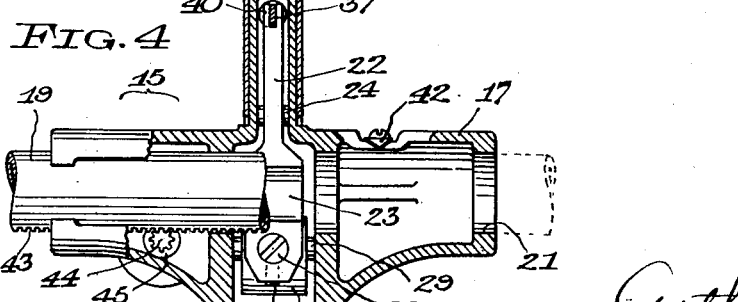
INVENTOR
Arthur J. Aumann
By R. L. Caldwell
ATTORNEY
WITNESSES
L. E. Kilian
C. L. Waal

UNITED STATES PATENT OFFICE 2,265,335

RIP GAUGE LOCK

Arthur J. Aumann, Milwaukee, Wis., assignor to The Delta Manufacturing Company, Milwaukee, Wis., a corporation of Wisconsin Application December 14, 1938, Serial No. 245,652

7 Claims. (Cl. 143—174)

This invention relates to work gauges or guides for use in connection with saw tables and other machine tables, and more particularly to locks for such gauges.

It has been found desirable to lock the rip gauge of a circular saw at both the front and rear portions of the saw table to prevent yielding or springing of the gauge. Constructions have heretofore been devised to permit the front and rear locking of the gauge to be effected from the front end portion of the gauge so as to avoid danger and inconvenience to the operator, but these constructions have required separate manipulations to lock the front and rear end portions of the gauge.

It is an object of the present invention to provide improved locking means for a rip gauge or other work gauge which will permit the gauge to be locked at a plurality of points in one operation.

Another object is to provide gauge-locking means of this character by which the locking operation will also effect alignment of the gauge on its guide means.

The invention further consists in the several features hereinafter described and claimed.

In the accompanying drawing, illustrating one specific embodiment of the invention, Fig. 1 is a side elevation of a circular saw equipped with a rip gauge constructed in accordance with the invention;

Fig. 2 is a plan view of the machine and its gauge;

Fig. 3 is a sectional elevation taken generally along the line 3—3 of Fig. 2, the gauge being locked, and an unlocking position of a hand-lever thereof being indicated in dotted lines, and Fig. 4 is a sectional elevation taken generally along the line 4—4 of Fig. 3.

In the drawing, the invention is illustrated in connection with a circular saw which comprises a saw table 10 and a saw blade 11 extending through an insert plate 12 in the table. The table is mounted on suitable supporting means 13, and has the usual guide grooves or channels 14, one being shown in Fig. 2, for guiding the customary miter gauge.

A rip gauge 15 is provided for guiding workpieces in ripping operations and comprises a gauge bar 16 of box-like cross-section rigidly screwed at its front end to a head-forming bracket 17 and at its rear end to a bracket 18. The front bracket 17 slidably fits on a guide bar 19 rigidly secured to and extending along the front edge of the table, and the rear bracket 18 is slidably saddled on a guide bar 20 rigidly secured to and extending along the rear edge of the table. The guide bars 19 and 20 are parallel to each other and to the top surface of the table and are here shown to be of the tubular form. These guide bars may extend beyond a side of the table, as is well understood in this art.

A bore 21 in the head bracket 17 receives the guide bar 19, the rear side of the bore being open to clear the securing means for the bar. The head bracket 17 is hollow and houses therein a clamping lever 22 which at an intermediate point has a concave arcuate clamping surface 23 adapted to fit and engage the rounded front side of the cylindrical guide bar 19. The lever 22 is mounted on a pivot pin 24 which is secured in the head bracket at a point higher than the clamping surface 23, the pin being parallel to the guide bar and extending through a short arcuate slot 25 formed in the lever about a radius from the center for the arcuate clamping surface 23. The lever 22 thus has a floating or lost-motion pivotal mounting. At a point lower than the clamping surface 23, the lever carries a forwardly projecting screw-threaded abutment plug 26 which is locked in adjusted position by a set-screw 27. The front end of the abutment plug 26 is engageable by an eccentric or cam 28 which is mounted on a pin 29 secured in the head bracket and extending parallel to the pivot pin 24. The cam 28 carries an actuator in the form of a knobbed hand-lever 30 which extends through a slot 31 formed in the head bracket.

Suitable means are provided for locking or clamping the gauge bracket 18 to the rear guide bar 20. By way of example, the bracket 18 has slidably mounted therein a vertically movable hooked locking member 31 adapted to engage the rounded underside of the guide bar. A compressed coiled spring 32, Fig. 3, bears on the upper end of the hooked locking member 31 and acts to release this locking member from the guide bar. Near its upper end the hooked locking member 31 has an opening 33 to receive the rearwardly projecting arm of a bell-crank lever 34 which is mounted within the bracket 18 on a pivot pin 35 secured to the bracket. The lever 34 has an upwardly projecting arm extending through a flattened apertured portion 36 of a horizontal rod 37 which extends longitudinally within the gauge bar 16 and which is slidably mounted at its end portions in the brackets 17 and 18. At its front end the rod 37 carries a shouldered sleeve nut 38 which is slidable in the head bracket 17 and is adjustably locked on the rod by a nut 39.

In order to provide for conjoint operation of the front and rear gauge-locking means, the hand-lever 30 has a connection with the rod 37. A preferred form of connection includes the locking lever 22, which at its lower end is engageable by the cam 28, the locking lever having a forked upper end 40, Figs. 3 and 4, which embraces a flattened portion of the rod 37 and bears against the rear end of the sleeve nut 38.

The front guide bar, 19, is provided along its top surface with a scale 41 adapted to cooperate with a pointer 42 carried by the head. The bottom surface of this guide bar is provided with rack teeth 43 adapted to cooperate with a pinion 44 formed on a knobbed adjusting shaft 45 journalled in the head, the shaft being axially movable to mesh and release the pinion. When the pinion 44 is meshed with the rack teeth, the gauge may be moved along the guide bars by rotating the pinion shaft by hand, thus facilitating accurate positioning of the gauge.

In operation, when it is desired to lock the rip gauge in adjusted position, the hand-lever 30 is swung downwardly from the dotted line position of Fig. 3 to the full line position. During the downward movement of the hand-lever, the cam or eccentric 28 urges the lower end of the clamping lever 22 to the left, as viewed in Fig. 3, causing the lever to swing clockwise about the pivot pin 24 which at that time engages the front end of the slot 25 in the lever, the forked upper end of the lever being urged rearwardly by the coiled spring 32 acting through the bell-crank lever 34 and rod 37. In the first part of the downward movement of the hand-lever the clamping face 23 of the locking lever presses against the front guide bar to aline and then lock the head bracket, this bracket acting like the head of a T-square to bring the rip gauge bar 16 into parallelism with the saw blade. As an incident to this alining action, the rear end of the gauge may have a slight lateral movement, such movement being freely permitted as the rear end of the gauge is not yet clamped. In the final movement of the hand-lever, the locking lever 22 pivots about the center of the front guide bar, causing the upper end of the locking lever to swing clockwise and to shift the rod 37 and its attached sleeve nut 38 forwardly, thereby swinging the bell-crank lever 34 clockwise and lifting the hooked locking member 31 into clamping engagement with the rear guide bar 20. The clockwise angular movement of the locking lever 22 about the center of the front guide bar is permitted by reason of the slot 25 in the locking lever through which the pivot pin 24 passes. When the hand-lever 30 reaches its lowermost position, the gauge is firmly locked at its front and rear ends, thus avoiding yielding or springing of the gauge bar. When it is desired to unlock the gauge it is only necessary to lift the hand-lever 30 to the dotted line position of Fig. 3, whereupon the gauge is released from both the front and rear guide bars, the spring 32 urging both the locking lever 22 and the hooked locking member 31 to released position. The cam or eccentric 28 is frictionally retained in its locking and unlocking positions.

While the invention is here shown to be embodied in a rip gauge for a circular saw, it is also applicable to other forms of work gauges.

What I claim as new and desire to secure by Letters Patent is:

1. In combination, with a machine table having a guideway, a gauge movable over said table and having a portion shiftable along said guideway, a device for locking another portion of said gauge to said table, a locking lever engageable with said guideway and having an operating connection with said locking device, and means for applying locking pressure to said lever, the latter being operable to fulcrum upon said guideway and apply locking pressure directly thereto when it is rocked.

2. In combination, with a machine table having a guide bar, a gauge movable over said table and having an end portion shiftable along said guide bar, a device for locking the other end portion of said gauge to said table, a locking lever having a lost motion pivotal mounting on said gauge and engageable with said guide bar, spring-retracted linkage connecting said locking device and the upper end of said lever, and means for applying pressure to the lower end of said lever and at a point lower than the region of engagement of said lever with said guide bar to urge said lever against said guide bar, said lever when thus subjected to pressure having a pivotal movement on said guide bar to shift said linkage for thereby operating said locking device.

3. In a work gauge, a gauge bar mounted for movement over a work table, a primary locking lever located at one end of said gauge bar and operable to lock one end thereof to the table when it is in locking condition; a secondary locking device at the other end of said gauge bar and operable to lock the other end thereof to the table when it is in locking condition; a force transmitting connection between said primary locking lever and said secondary locking device; resilient means constantly urging said primary locking lever and said secondary locking device toward unlocking condition; means for applying actuating forces to said primary locking lever, and the latter having means so pivoting it, that upon initial movement thereof toward locking position it will align said gauge with the table and lock said one end thereof with a force proportional to the stress built up in said resilient means, and upon final locking movement it will bring said secondary locking device into locking condition and simultaneously rigidly lock said one end of the gauge bar to the table.

4. In a work gauge, a table having guideways at opposite sides thereof; a gauge bar mounted for movement upon said guideways; a primary locking lever located at one end of said gauge bar and operable to lock one end thereof to one of said guideways when it is in locking condition; a secondary locking device at the other end of said gauge bar and operable to lock the other end thereof to the other of said guideways when it is in locking condition; a force transmitting connection between said primary locking lever and said secondary locking device; resilient means constantly urging said primary locking lever and said secondary locking device toward unlocking condition; means for applying actuating forces to said primary locking lever, and the latter having means so pivoting it, that upon initial movement thereof toward locking position it will align said gauge with the table and fulcrum upon one of said guideways with a force proportional to the stress built up in said resilient means, and upon final locking movement it will bring said secondary locking device into locking condition and simultaneously fulcrum upon said one guideway with sufficient force to rigidly lock said one end of said gauge thereto.

5. In a work gauge, a work support having substantially parallel guides at opposite sides thereof; a gauge structure extending across said support and slidable on said guides; a locking device at each end of said gauge structure cooperating with said guides; means interconnecting said locking devices and embodying a predetermined degree of lost-motion; common actuating means for said locking devices and tending to simultaneously shift said locking devices toward locking position when it is operated; and resilient means for taking up said lost-motion and causing first one and then the other of said locking devices to grip their guides in predetermined sequence when said actuating means is operated.

6. In a work gauge, a table having guides at opposite sides thereof; a gauge bar mounted for sliding movement on said guides and having an actuating device located at one end thereof; a locking mechanism located at each end of said gauge bar and cooperating with said guides, said actuating device cooperating with one of said locking mechanisms to lock it to one of said guides when said actuating device is moved into a primary locking position; and means including a mechanical connection between said actuating device and said other locking mechanism, for automatically locking said other locking mechanism to the other of said guides when said actuating device is moved into a secondary locking position.

7. In a work gauge, a table having guides at opposite sides thereof; a gauge bar mounted for sliding movement on said guides and having an actuating device located at one end thereof; a locking mechanism located at each end of said gauge bar and cooperating in frictional engagement with said guides, said actuating device cooperating directly with one of said locking mechanisms to lock it to one of said guides when said actuating device is moved into a primary locking position; means for automatically locking said other locking mechanism to the other of said guides when said actuating device is moved into a secondary locking position; and means for adjusting the point in the travel of said actuating device at which said other locking mechanism will be locked to said other guide.

ARTHUR J. AUMANN.